US011442882B2

(12) United States Patent
Lai (10) Patent No.: US 11,442,882 B2
(45) Date of Patent: Sep. 13, 2022

(54) BRIDGE CIRCUIT FOR PROVIDING CONVERSION BETWEEN PCIE-NVME PROTOCOL AND NVME-TCP PROTOCOL AND COMPUTER SYSTEM USING THE SAME (71) Applicant: VIA Technologies Inc., New Taipei (TW)

(72) Inventor: Jiin Lai, New Taipei (TW)

(73) Assignee: VIA Technologies Inc., New Taipei (TW)

( * ) Notice: Subject to any disclaimer, the term of this patent is extended or adjusted under 35 U.S.C. 154(b) by 0 days.

(21) Appl. No.: 17/234,751

(22) Filed: Apr. 19, 2021

(65) Prior Publication Data
US 2021/0342287 A1 Nov. 4, 2021

Related U.S. Application Data (60) Provisional application No. 63/019,435, filed on May 4, 2020.

(30) Foreign Application Priority Data

Mar. 3, 2021 (TW) .................................. 110107558

(51) Int. Cl.
G06F 13/40 (2006.01)
G06F 13/16 (2006.01)
(Continued)

(52) U.S. Cl.
CPC ...... *G06F 13/4027* (2013.01); *G06F 13/1668* (2013.01); *G06F 13/4282* (2013.01); *H04L 69/161* (2013.01); *G06F 2213/0026* (2013.01)

(58) Field of Classification Search
CPC ............ G06F 13/4027; G06F 13/1668; G06F 13/4282; H04L 69/161
See application file for complete search history.

(56) References Cited

U.S. PATENT DOCUMENTS 9,430,268 B2 * 8/2016 Hussain ............. H04L 67/1097
10,075,524 B1 * 9/2018 Bshara ................ H04L 67/025
(Continued)

FOREIGN PATENT DOCUMENTS

CN 108733601 A 11/2018
CN 110147335 A 8/2019
(Continued)

OTHER PUBLICATIONS

Office action dated Feb. 8, 2022 for TW application No. 110107558, filing date: Mar. 3, 2021, pp. 1-13, The search result(s) can be found on p. 13 of the document.

*Primary Examiner* — Henry Tsai
*Assistant Examiner* — Christopher A Daley
(74) *Attorney, Agent, or Firm* — Winston Hsu (57) ABSTRACT

A bridge circuit includes an NVMe device controller, a network subsystem, and a data transfer circuit. The NVMe device controller is arranged to communicate with a host via a PCIe bus. The network subsystem is arranged to communicate with an NVMe-TCP device via a network. The data transfer circuit is coupled between the NVMe device controller and the network subsystem, and is arranged to deal with data transfer associated with the NVMe-TCP device without intervention of the host.

13 Claims, 5 Drawing Sheets

(51) Int. Cl.
    *G06F 13/42*          (2006.01)
    *H04L 69/16*         (2022.01)

(56) References Cited

U.S. PATENT DOCUMENTS

| | | | |
|---|---|---|---|
| 10,282,094 B2 * | 5/2019 | Kachare | G06F 3/0635 |
| 11,086,813 B1 * | 8/2021 | Schuette | G06F 13/4022 |
| 2012/0144086 A1 * | 6/2012 | Lai | G06F 13/4291 |
| | | | 710/313 |
| 2015/0378606 A1 * | 12/2015 | Huang | G06F 13/387 |
| | | | 711/103 |
| 2017/0075828 A1 * | 3/2017 | Monji | G06F 13/42 |
| 2018/0189204 A1 * | 7/2018 | Sternberg | G06F 13/42 |
| 2020/0201692 A1 * | 6/2020 | Kachare | G06F 9/545 |
| 2020/0293465 A1 * | 9/2020 | Yang | G06F 13/128 |
| 2021/0248416 A1 * | 8/2021 | Navon | G06N 3/08 |

FOREIGN PATENT DOCUMENTS

| | | | |
|---|---|---|---|
| TW | 201945921 A | 12/2019 | |
| TW | 201945956 A | 12/2019 | |

\* cited by examiner

BRIDGE CIRCUIT FOR PROVIDING CONVERSION BETWEEN PCIE-NVME PROTOCOL AND NVME-TCP PROTOCOL AND COMPUTER SYSTEM USING THE SAME

CROSS REFERENCE TO RELATED APPLICATIONS

This application claims the benefit of U.S. provisional application No. 63/019,435, filed on May 4, 2020 and Taiwan application No. 110107558, filed on Mar. 3, 2021. The entirety of each of the above-mentioned patent applications is hereby incorporated herein by reference.

BACKGROUND OF THE INVENTION

1. Field of the Invention

The present invention is related to data processing, and more particularly, to a bridge circuit that can provide conversion between the PCIe-NVMe protocol and the NVMe-TCP protocol and a computer system using the bridge circuit.

2. Description of the Prior Art

Non-volatile memory express (NVMe) is a host control interface specification of the non-volatile memory, which is a communication protocol designed specifically for a flash memory device using a peripheral component interconnect express (PCIe) bus. For example, the host may write data into a solid-state drive (SSD) with a PCIe interface via a PCIe-NVMe protocol, and may read the data stored in the SSD with the PCIe interface via the PCIe-NVMe protocol. Compared with the SSD using other input/output interface, the SSD with the PCIe interface may be equipped with faster reading and writing speed by virtue of the PCIe-NVMe protocol. However, since the host needs to access the SSD via the PCIe bus, the standard PCIe-NVMe protocol cannot be applicable to data access of a remote storage device. As a result, in recent years, an NVMe-over-Fabrics (NVMe-oF) scheme has emerged to support network storage of the data center, wherein the NVMe-over-TCP (NVMe-TCP) protocol can operate on the existing network infrastructure without special switches, routers and network cards. Therefore, the deployment of the remote storage device can be easily realized via the NVMe-TCP protocol.

However, for the host end, the complexity of the NVMe-TCP protocol itself will greatly increase the computing load of the central processing unit (CPU). In addition, in order to access an NVMe-TCP device (e.g. an SSD connected to a local network), the host end needs to additionally install new drivers. Since different drivers are needed to handle the PCIe-NVMe protocol and the NVMe-TCP protocol, respectively, they will inevitably increase system complexity.

SUMMARY OF THE INVENTION

It is therefore an objective of the present invention to provide a bridge circuit that can provide conversion between the PCIe-NVMe protocol and the NVMe-TCP protocol and a computer system using the bridge circuit.

In an embodiment of the present invention, a bridge circuit is provided. The bridge circuit includes an NVMe device controller, a network subsystem, and a data transfer circuit. The NVMe device controller is arranged to communicate with a host via a PCIe bus. The network subsystem is arranged to communicate with an NVMe-TCP device via a network. The data transfer circuit is coupled between the NVMe device controller and network subsystem, and is arranged to deal with data transfer associated with the NVMe-TCP device without intervention of the host.

In another embodiment of the present invention, a computer system is provided. The computer system includes a host and a bridge circuit. The bridge circuit includes an NVMe device controller, a network subsystem, and a data transfer circuit. The NVMe device controller is arranged to communicate with the host via a PCIe bus. The network subsystem is arranged to communicate with an NVMe-TCP device via a network. The data transfer circuit is coupled between the NVMe device controller and network subsystem, and is arranged to deal with data transfer associated with the NVMe-TCP device. The bridge circuit makes the host regard the NVMe-TCP device as a PCIe-NVMe device for data access.

In another embodiment of the present invention, a computer system is provided. The computer system includes a host and a bridge circuit. The bridge circuit includes an NVMe device controller, a network subsystem, and a data transfer circuit. The NVMe device controller is arranged to communicate with the host via a PCIe bus. The network subsystem is arranged to communicate with an NVMe-TCP device via a network. The data transfer circuit is coupled between the NVMe device controller and network subsystem, and is arranged to deal with data transfer associated with the NVMe-TCP device. The host loads and executes a PCIe-NVMe driver to control communication between the host and the NVMe device controller, without being equipped with an NVMe-TCP driver.

The bridge circuit provided by the present invention may offload processing of the NVMe-TCP from a host end processor. As a result, the computing load of the host end processor is greatly reduced. In addition, with the help of the bridge circuit provided by the present invention, the host end processor only needs to execute the PCIe-NVMe driver to complete data access of the NVMe-TCP device. There is no need to install and execute the NVMe-TCP driver on the host end. Therefore, the system complexity can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
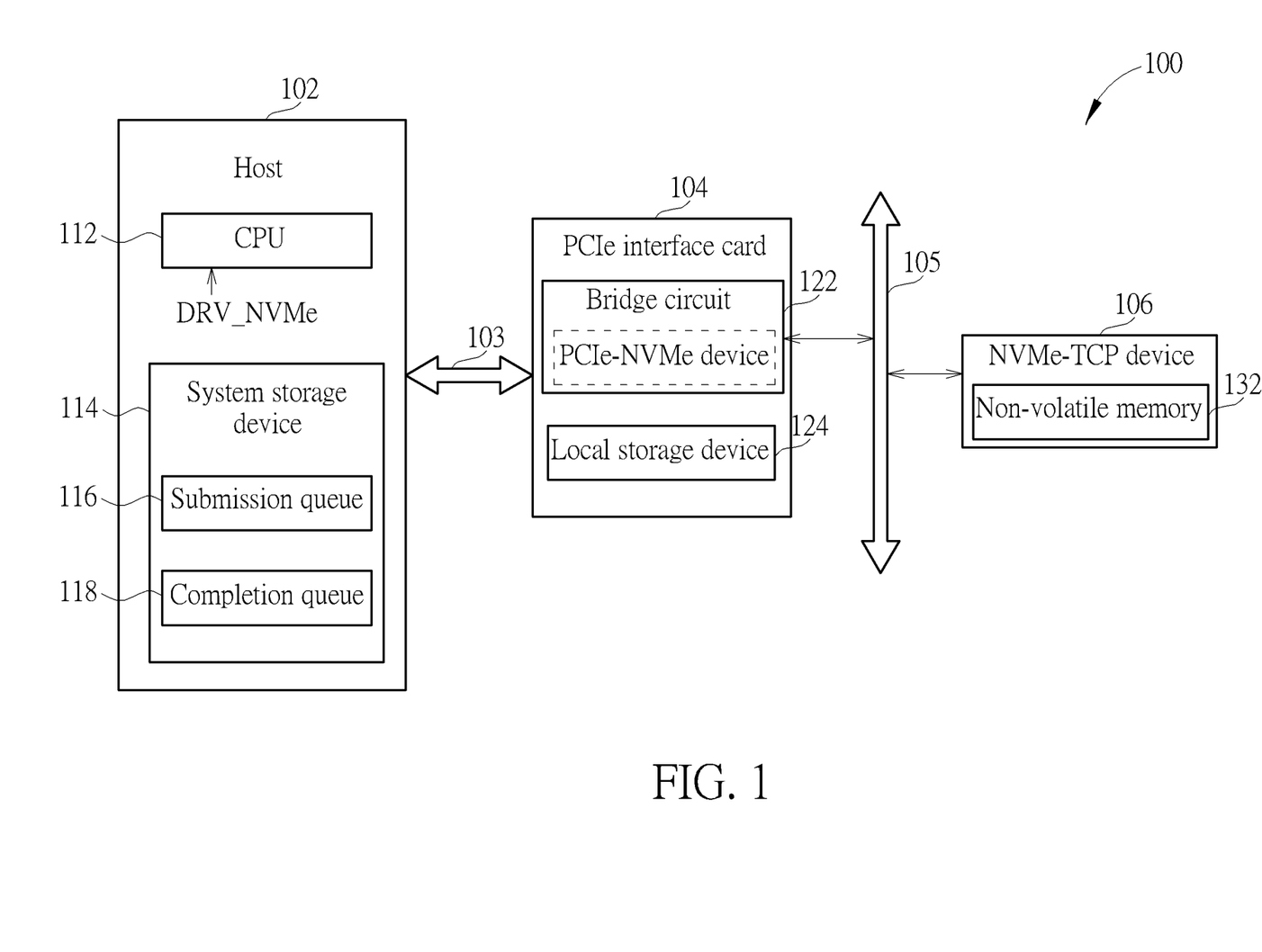
FIG. 1 is a diagram illustrating a computer system using a bridge circuit of the present invention.

FIG. 1 is a diagram illustrating a computer system using a bridge circuit of the present invention. The computer system 100 includes a host 102, a PCIe interface card 104, and at least one NVMe-TCP device 106. For brevity, FIG. 1 illustrates only one NVMe-TCP device 106. However, in practical applications, the computer system 100 can be equipped with a plurality of NVMe-TCP devices 106 according to application requirements. The host 102 includes a CPU 112 and a system storage device 114. For example, the system storage device 114 can be a memory. In addition, the system storage device 114 is equipped with a submission queue (SQ) 116 and a completion queue (CQ) 118, wherein the SQ 116 is arranged to store commands sent by the host 102, and the CQ 118 is paired with the SQ 116, and is arranged to store completion information of the commands. The PCIe interface card 104 is equipped with a bridge circuit 122 and a local storage device 124 that can be used by the bridge circuit 122. For example, the local storage device 124 can be a memory. The PCIe interface card 104 can be installed in a PCIe slot on the host 102. As a result, the bridge circuit 122 can communicate with the host 102 via a PCIe bus 103. In this embodiment, the bridge circuit 122 and the NVMe-TCP device 106 are both connected to a network 105. For example, the network 105 is a local area network. The NVMe-TCP device 106 includes a non-volatile memory 132. For example, the NVMe-TCP device 106 is an SSD using the NVMe-TCP protocol. In this embodiment, the bridge circuit 122 can provide conversion between the PCIe-NVMe protocol and the NVMe-TCP protocol. In other words, the bridge circuit 122 communicates with the host 102 via the PCIe-NVMe protocol, and communicates with the NVMe-TCP device 106 via the NVMe-TCP protocol. As a result, the host 102 itself does not need to process NVMe-TCP protocol stack. The host 102 only needs to load and execute the PCIe-NVMe driver DRV_NVMe to control communication between the host 102 and the bridge circuit 122, and does not need to be equipped with the NVMe-TCP driver. More specifically, the bridge circuit 122 can make the host 102 regard the NVMe-TCP device 106 as a PCIe-NVMe device for data access.

Figure 2:
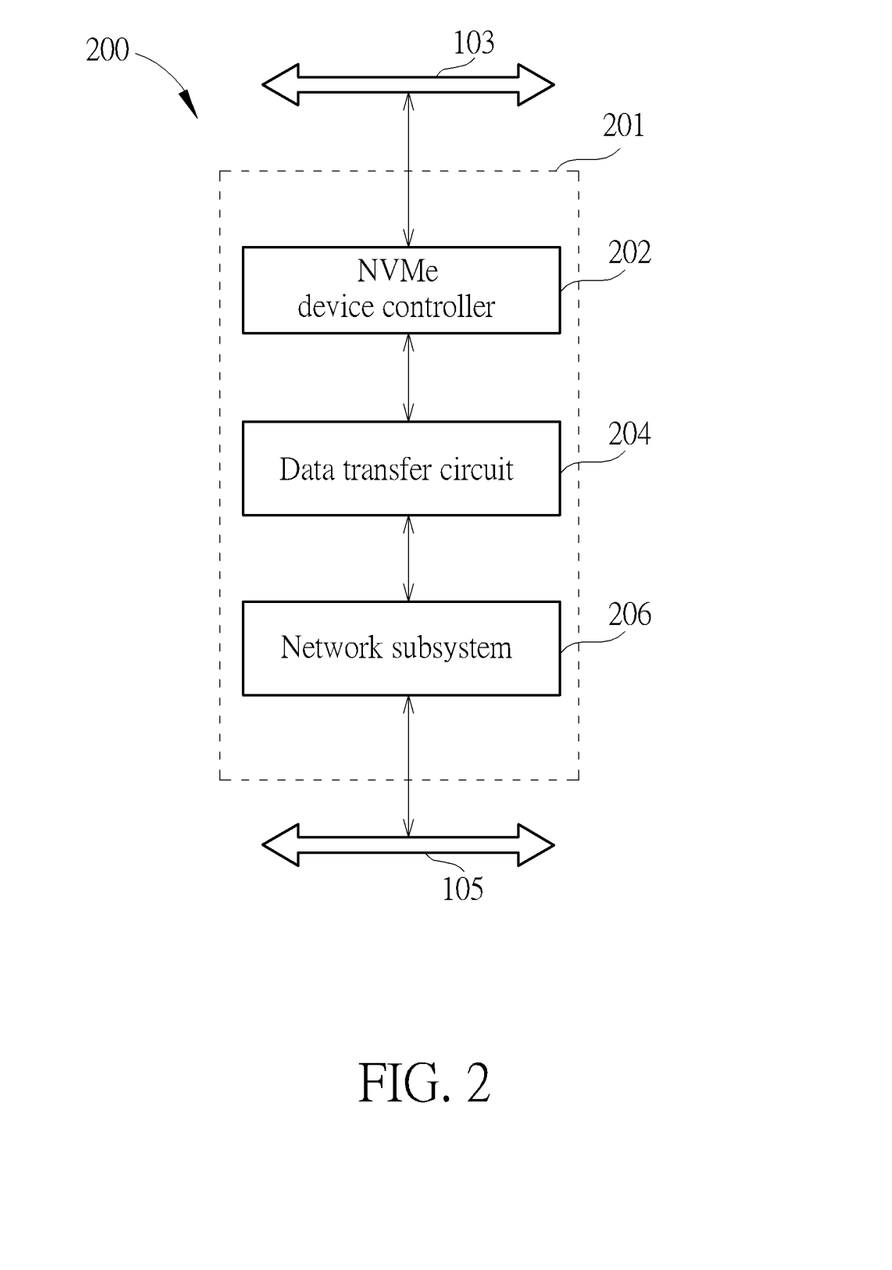
FIG. 2 is a diagram illustrating a bridge circuit according to an embodiment of the present invention.

FIG. 2 is a diagram illustrating a bridge circuit according to an embodiment of the present invention. The bridge circuit 122 shown in FIG. 1 can be implemented by a bridge circuit 200 shown in FIG. 2. As shown in FIG. 2, the bridge circuit 200 includes an NVMe device controller 202, a data transfer circuit 204, and a network subsystem 206. In this embodiment, the NVMe device controller 202, the data transfer circuit 204, and the network subsystem 206 are all disposed in a same chip 201. The NVMe device controller 202 is arranged to communicate with the host 102 via the PCIe bus 103. The network subsystem 206 is arranged to communicate with the NVMe-TCP device 106 via the network 105 (e.g. the local area network). The data transfer circuit 204 is equipped with direct memory access (DMA) capability, and is coupled between the NVMe device controller 202 and the network subsystem 206, and is arranged to deal with data transfer associated with the NVMe-TCP device without intervention of the host 102, where the data transfer associated with the NVMe-TCP device includes transferring the data of the host 102 to the non-volatile memory 132 in the NVMe-TCP device 106 via the NVMe device controller 202 and the network subsystem 206, and transferring the data stored in the non-volatile memory 132 of the NVMe-TCP device 106 to the host 102 via the NVMe device controller 202 and the network subsystem 206.

Figure 3:
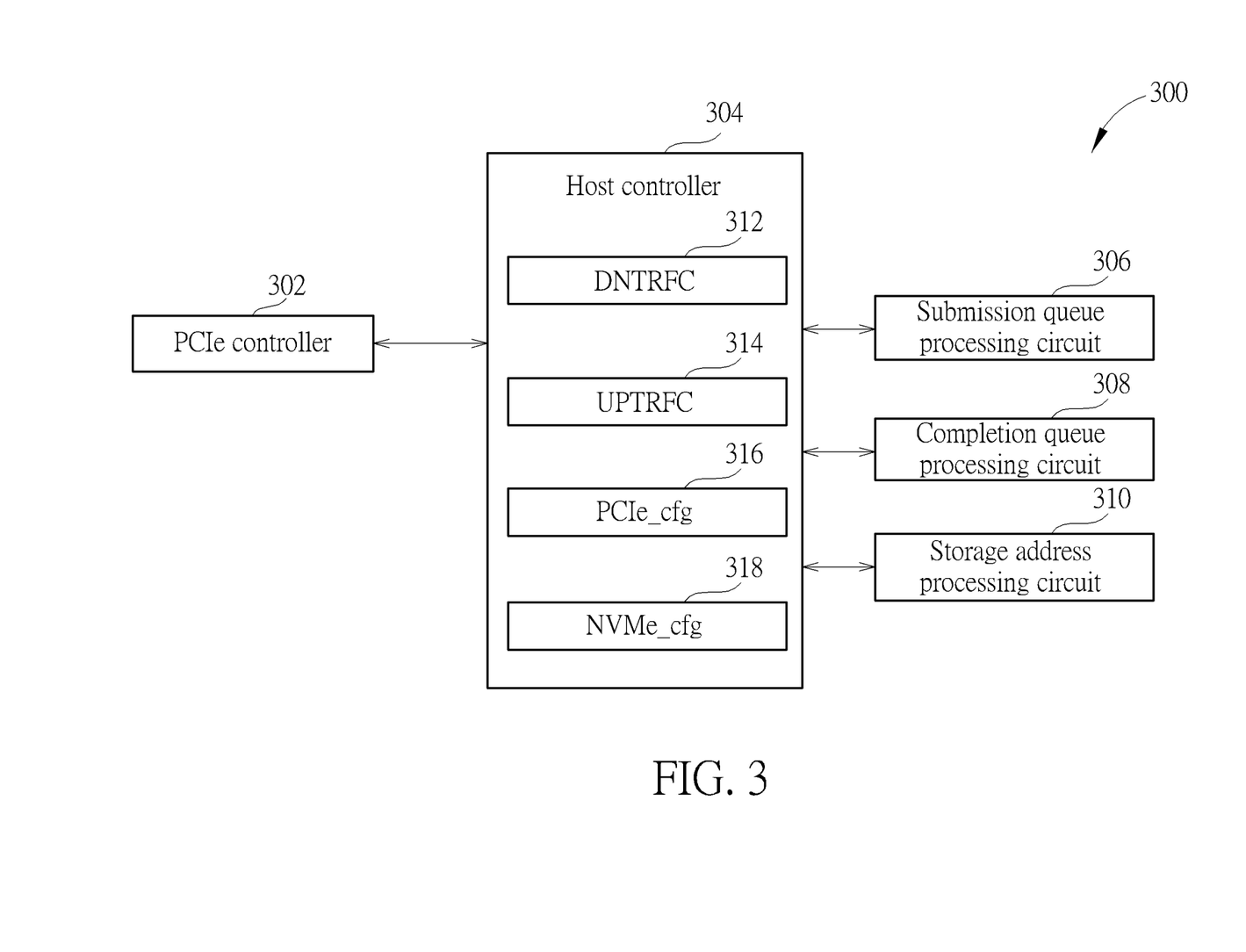
FIG. 3 is a diagram illustrating an NVMe device controller according to an embodiment of the present invention.

FIG. 3 is a diagram illustrating an NVMe device controller according to an embodiment of the present invention. The NVMe device controller 202 shown in FIG. 2 may be realized by an NVMe device controller 300 shown in FIG. 3. As shown in FIG. 3, the NVMe device controller 300 includes a PCIe controller 302, a host controller 304, a submission queue (SQ) processing circuit 306, a completion queue (CQ) processing circuit 308, and a storage address processing circuit 310. The PCIe controller 302 is arranged to access the PCIe bus 103. The host controller 304 includes a plurality of functional blocks, wherein a functional block (labeled as DNTRFC) 312 is arranged to control the downstream transaction of the PCIe bus 103, a functional block (labeled as UPTRFC) 314 is arranged to control the upstream transaction of the PCIe bus 103, a functional block (labeled as PCIe_cfg) 316 includes the register for storing PCIe configuration setting, and a functional block (labeled as NVMe_cfg) 318 includes the register for storing NVMe configuration setting.

The SQ processing circuit 306 is arranged to read and process a command (e.g. write command or read command) in the SQ 116 of the host 102. For example, after the host 102 writes the command (e.g. write command or read command) into the SQ 116, the host 102 notifies the NVMe device controller 300, and the SQ processing circuit 306 retrieves the command (e.g. write command or read command) from the SQ 116. The CQ processing circuit 308 is arranged to write the completion information of the command (e.g. write command or read command) into the CQ 118 of the host 102. For example, when the data transfer circuit 204 has transmitted the host-end data indicated by a write command to the non-volatile memory 132 in the NVMe-TCP device 106, the CQ processing circuit 308 writes the completion information of the write command into the CQ 118. Similarly, when the data transfer circuit 204 has transmitted the device-end data indicated by a read command to the system storage device 114 in the host 102, the CQ processing circuit 308 writes the completion information of the read command into the CQ 118.

The storage address processing circuit 310 is arranged to retrieve storage address information carried by the command (e.g. write command or read command), and may configure the data transfer circuit 204 according to the storage address information. For example, the storage address information includes a designated storage address in the system storage device 114. When the command to be processed in the SQ 116 is a write command, the host-end data written into the non-volatile memory 132 in the NVMe-TCP device 106 is read from the storage address designated by the storage address information. In addition, when the command to be processed in the SQ 116 is a read command, the device-end data read from the non-volatile memory 132 in the NVMe-TCP device 106 is written into the storage address designated by the storage address information. In this embodiment, the storage address information may be recorded by utilizing a data structure of a scatter gather list (SGL), but the present invention is not limited thereto. In other embodiments, the storage address information may be recorded by utilizing a data structure of a physical region page (PRP). Since the storage address information carried by the NVMe command (e.g. write command or read command) includes the designated storage address in the system storage device 114, the storage address processing circuit 310 may configure the data transfer circuit 204 accordingly, so as to make the data transfer circuit 204 correctly process data transfer operations associated with the NVMe-TCP device 106.

Figure 4:
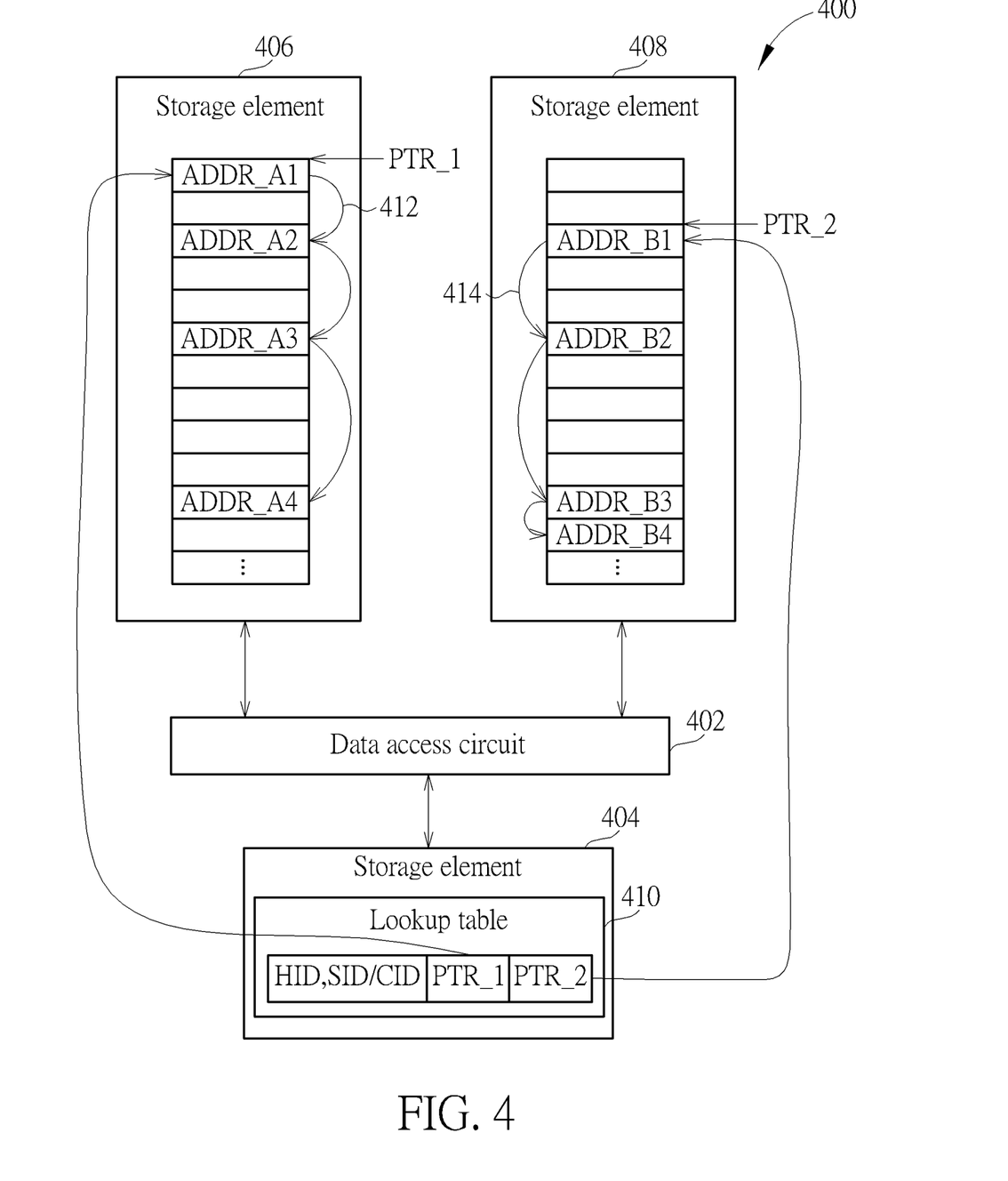
FIG. 4 is a diagram illustrating a data transfer circuit according to an embodiment of the present invention.

FIG. 4 is a diagram illustrating a data transfer circuit according to an embodiment of the present invention. The data transfer circuit 204 shown in FIG. 2 may be realized by a data transfer circuit 400 shown in FIG. 4. As shown in FIG. 4, the data transfer circuit 400 includes a data access circuit 402 and a plurality of storage elements (e.g. memories) 404, 406, and 408. The storage element 406 is arranged to store a linked list 412, wherein each node in the linked list 412 records a storage address in the system storage device 114. For example, a plurality of nodes of the linked list 412 record a plurality of storage addresses ADDR_A1, ADDR_A2, ADDR_A3, and ADDR_A4 in the system storage device 114, respectively. The storage element 408 is arranged to store another linked list 414, wherein each node in the linked list 414 records a storage address in the local storage device 124. For example, a plurality of nodes of the linked list 414 record a plurality of storage addresses ADDR_B1, ADDR_B2, ADDR_B3, and ADDR_B4 in the local storage device 124, respectively. The storage element 404 is arranged to store a lookup table 410, wherein the lookup table 410 records a storage address PTR_1 of a first node in the linked list 412 (which is the node records the storage address ADDR_A1 in this embodiment) in the storage element 406 and a storage address PTR_2 of a first node in the linked list 414 (which is the node records the storage address ADDR_B1 in this embodiment) in the storage element 408. The data access circuit 402 is arranged to read the linked lists 412 and 414 according to the lookup table 410, to process data transfer operations between the host 102 and the NVMe-TCP device 106.

When the host 102 writes an NVMe command (e.g. write command or read command) into the SQ 116, the NVMe command has a corresponding NVMe command identifier HID. In addition, through the network 105, the bridge circuit 122 communicates with the NVMe-TCP device 106 by means of a TCP session identifier SID, and generates and transmits an NVMe-TCP command (e.g. write command or read command) to the NVMe-TCP device 106 according to the PCIe-NVMe command, wherein the NVMe-TCP command similarly has a corresponding command identifier CID. In this embodiment, a set of an NVMe command identifier HID and a corresponding pair of a TCP session identifier SID and an NVMe-TCP command identifier CID serves as an index of the lookup table 410. As shown in FIG. 4, the lookup table 410 maps a set of an NVMe command identifier HID, a TCP session identifier SID, and an NVMe-TCP command identifier CID to the storage address PTR_1 in the storage element 406 where the first node of the linked list 412 is stored and the storage address PTR_2 in the storage element 408 where the first node of the linked list 414 is stored. As a result, the data access circuit 402 may read pointers of starting points of the linked lists from the lookup table 410 according to the set of the NVMe command identifier HID, the TCP session identifier SID, and the NVMe-TCP command identifier CID, where the pointers of starting points of the linked lists include the storage address PTR_1 in the storage element 406 where the first node of the linked list 412 is stored and the storage address PTR_2 in the storage element 408 where the first node of the linked list 414 is stored.

According to the NVMe command (e.g. write command or read command) issued from the host 102, the data access circuit 402 may refer to the namespace to be accessed to determine which NVMe-TCP device on the network 105 is to be accessed. If the NVMe-TCP device 106 is to be accessed, the data access circuit 402 binds the TCP connection between the bridge circuit 122 and the NVMe-TCP device 106 with the namespace of the NVMe-TCP device 106. When the bridge circuit 122 transmits the NVMe-TCP command to the NVMe-TCP device 106, the data access circuit 402 establishes the lookup table 410 and sets the linked list 412 in the storage element 406 and the linked list 414 in the storage element 408 according to the information provided by the storage address processing circuit 310 (i.e. the storage address information carried by the NVMe command).

If the NVMe command issued from the host 102 is a write command, the data access circuit 402 starts to read the storage addresses ADDR_A1-ADDR_A4 recorded by the linked list 412 according to the storage address PTR_1 in the storage element 406 where the first node of the linked list 412 is stored, for reading a data from the system storage device 114 (particularly, the storage addresses ADDR_A1-ADDR_A4 of the system storage device 114), and starts to read the storage addresses ADDR_B1-ADDR_B4 recorded by the linked list 414 according to the storage address PTR_2 in the storage element 408 where the first node of the linked list 414 is stored, for writing the data into the local storage device 124 (particularly, the storage addresses ADDR_B1-ADDR_B4 of the local storage device 124). Then, the data access circuit 402 starts to read the storage addresses ADDR_B1-ADDR_B4 recorded by the linked list 414 according to the storage address PTR_2 in the storage elements 408 where the first node of the linked list 414 is stored, for reading the data from the local storage device 124 (particularly, the storage addresses ADDR_B1-ADDR_B4 of the local storage device 124), and transmits the data to the NVMe-TCP device 106 through the network subsystem 206, for writing the data into the non-volatile memory 132.

If the NVMe command transmitted by the host 102 is a read command, the network subsystem 206 reads a data from the NVMe-TCP device 106. In addition, the data access circuit 402 starts to read the storage addresses ADDR_B1-ADDR_B4 recorded by the linked list 414 according to the storage address PTR_2 in the storage element 408 where the first node of the linked list 414 is stored, for writing the data into the local storage device 124 (particularly, the storage addresses ADDR_B1-ADDR_B4 of the local storage device 124). Then, the data access circuit 412 starts to read the storage addresses ADDR_B1-ADDR_B4 recorded by the linked list 414 according to the storage address PTR_2 in the storage element 408 where the first node of the linked list 414 is stored, for reading the data from the local storage device 124 (particularly, the storage addresses ADDR_B1-ADDR_B4 of the local storage device 124), and starts to read the storage addresses ADDR_A1-ADDR_A4 recorded by the linked list 412 according to the storage address PTR_1 in the storage element 406 where the first node of the linked list 412 is stored, for writing the data into the system storage device 114 (particularly, the storage addresses ADDR_A1-ADDR_A4 of the system storage device 114).

Figure 5:
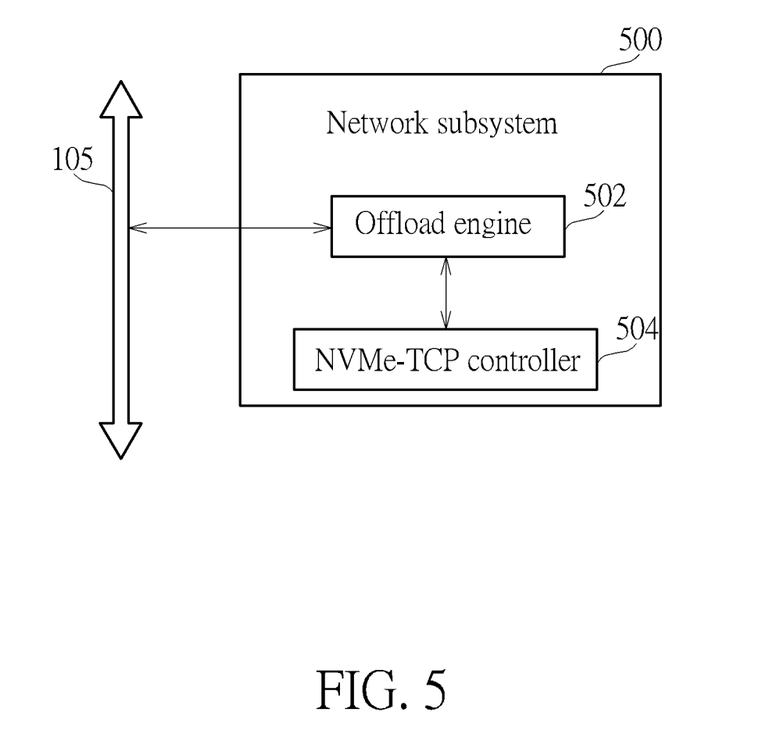
FIG. 5 is a diagram illustrating a network subsystem according to an embodiment of the present invention.

As mentioned before, the network subsystem 206 communicates with the NVMe-TCP device 106 through the network (e.g. the local area network) 105. For example, the network subsystem 206 transmits the command to the NVMe-TCP device 106, transmits the write data to the NVMe-TCP device 106, and reads data from the NVMe-TCP device 106 through the network 105. FIG. 5 is a diagram illustrating a network subsystem according to an embodiment of the present invention. The network subsystem 206 shown in FIG. 2 may be realized by a network subsystem 500 shown in FIG. 5. As shown in FIG. 5, the network subsystem 500 includes an offload engine 502 and an NVMe-TCP controller 504. The offload engine 502 is dedicated hardware for dealing with the Transmission Control Protocol/Internet Protocol (TCP/IP) stack between the network subsystem 500 and the NVMe-TCP device 106. As a result, the bridge circuit 122/200 does not need the processor to intervene in the processing of the TCP/IP stack.

The NVMe-TCP controller 504 is arranged to trigger the data transfer circuit 204/400 to read data from the host 102 and transmit the data to the NVMe-TCP device 106 through the offload engine 502, and trigger the data transfer circuit 204/400 to transmit the data received by the offload engine 502 from the NVMe-TCP device 106 to the host 102. In addition, the NVMe-TCP controller 504 may also encode the TCP session identifier SID and the NVMe-TCP command identifier CID into the network packet according to the NVMe command identifier HID, and may further encode the NVMe-TCP data (which includes write command or read command) and add corresponding cyclic redundancy check (CRC) data to the network packet. The NVMe-TCP controller 504 may also decode the network packet to obtain the NVMe-TCP data (which includes the completion information of the write command or the completion information of the read command), and may perform data correctness check and error correction according to the corresponding CRC data.

In summary, the bridge circuit provided by the present invention may offload the processing of the NVMe-TCP from the host end, which greatly reduces the computing load of the host processor. In addition, with the help of the bridge circuit provided by the present invention, the host processor only needs to execute the PCIe-NVMe driver to complete a data access of the NVMe-TCP device. There is no need to install and execute the NVMe-TCP driver on the host end. As a result, the system complexity may be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bridge circuit, comprising:
a Non-Volatile Memory Express (NVMe) device controller, arranged to communicate with a host via a Peripheral Component Interconnect Express (PCIe) bus;
a network subsystem, arranged to communicate with an NVME over Transmission Control Protocol (NVMe-TCP) device via a network; and
a data transfer circuit, coupled between the NVMe device controller and the network subsystem, and arranged to deal with data transfer associated with the NVMe-TCP device without intervention of the host;
wherein data transfer between the host and the NVMe-TCP device is processed according to a set of an NVMe command identifier, a TCP session identifier, and an NVMe-TCP command identifier.

2. The bridge circuit of claim 1, wherein the NVMe device controller comprises:
a PCIe controller, arranged to access the PCIe bus;
a host controller, coupled to the PCIe controller, and arranged to control upstream transaction and downstream transaction of the PCIe bus, NVMe configuration setting, and PCIe configuration setting;
a submission queue processing circuit, coupled to the host controller, and arranged to read and process a command in a submission queue of the host;
a completion queue processing circuit, coupled to the host controller, and arranged to write completion information of the command into a completion queue of the host; and
a storage address processing circuit, coupled to the host controller, and arranged to retrieve storage address information carried by the command, and configure the data transfer circuit according to the storage address information.

3. The bridge circuit of claim 1, wherein the network subsystem comprises:
an offload engine, arranged to process Transmission Control Protocol/Internet Protocol (TCP/IP) stack between the network subsystem and the NVMe-TCP device; and
an NVMe-TCP controller, arranged to trigger the data transfer circuit to read data from the host and transmit the data to the NVMe-TCP device via the offload engine, and trigger the data transfer circuit to transmit data received by the offload engine from the NVMe-TCP device to the host.

4. The bridge circuit of claim 1, wherein the data transfer circuit comprises:
a first storage element, arranged to store a first linked list, where each node in the first linked list records a storage address in a system storage device of the host;
a second storage element, arranged to store a second linked list, where each node in the second linked list records a storage address in a local storage device used by the bridge circuit;
a third storage element, arranged to store a lookup table, where the lookup table records a storage address of a first node in the first linked list in the first storage element and a storage address of a first node in the second linked list in the second storage element; and
a data access circuit, arranged to read the first linked list and the second linked list according to the lookup table, to process data transfer between the host and the NVMe-TCP device.

5. The bridge circuit of claim 4, wherein the lookup table further records that the set of the NVMe command identifier, the TCP session identifier, and the NVMe-TCP command identifier that is mapped to the storage address of the first node in the first linked list in the first storage element and the storage address of the first node in the second linked list in the second storage element; and the data access circuit is further arranged to read the storage address of the first node in the first linked list in the first storage element and the storage address of the first node in the second linked list in the second storage element from the lookup table according to the set of the NVMe command identifier, the TCP session identifier, and the NVMe-TCP command identifier.

6. The bridge circuit of claim 4, wherein the data access circuit starts to read the first linked list according to the storage address of the first node in the first linked list in the first storage element, to read a data from the system storage device, and starts to read the second linked list according to the storage address of the first node in the second linked list in the second storage element, to write the data into the local storage device.

7. The bridge circuit of claim 6, wherein the data access circuit further starts to read the second linked list according to the storage address of the first node in the second linked list in the second storage element, to read the data from the local storage device, and transmits the data to the NVMe-TCP device via the network subsystem.

8. The bridge circuit of claim 4, wherein the network subsystem receive a data from the NVMe-TCP device; and the data access circuit starts to read the second linked list according to the storage address of the first node in the second linked list in the second storage element, to write the data into the local storage device.

9. The bridge circuit of claim 8, wherein the data access circuit further starts to read the second linked list according to the storage address of the first node in the second linked list in the second storage element, to read the data from the local storage device, and starts to read the first linked list according to the storage address of the first node in the first linked list in the first storage element, to write the data into the system storage device.

10. The bridge circuit of claim 1, wherein the bridge circuit is disposed in a PCIe interface card.

11. The bridge circuit of claim 1, wherein the NVMe device controller, the network subsystem, and the data transfer circuit are all disposed in a same chip.

12. A computer system, comprising:
a host; and
a bridge circuit, comprising:
   a Non-Volatile Memory Express (NVMe) device controller, arranged to communicate with the host via a Peripheral Component Interconnect Express (PCIe) bus;
   a network subsystem, arranged to communicate with an NVME over Transmission Control Protocol (NVMe-TCP) device via a network; and
   a data transfer circuit, coupled between the NVMe device controller and the network subsystem, and arranged to deal with data transfer associated with the NVMe-TCP device;
   wherein the bridge circuit makes the host regard the NVMe-TCP device as a PCIe-NVMe device for data access, and data transfer between the host and the NVMe-TCP device is processed according to a set of an NVMe command identifier, a TCP session identifier, and an NVMe-TCP command identifier.

13. A computer system, comprising:
a host; and
a bridge circuit, comprising:
   a Non-Volatile Memory Express (NVMe) device controller, arranged to communicate with the host via a Peripheral Component Interconnect Express (PCIe) bus;
   a network subsystem, arranged to communicate with an NVME over Transmission Control Protocol (NVMe-TCP) device via a network; and
   a data transfer circuit, coupled between the NVMe device controller and the network subsystem, and arranged to deal with data transfer associated with the NVMe-TCP device;
   wherein the host loads and executes a PCIe-NVMe driver to control communication between the host and the NVMe device controller, without being equipped with an NVMe-TCP driver, and data transfer between the host and the NVMe-TCP device is processed according to a set of an NVMe command identifier, a TCP session identifier, and an NVMe-TCP command identifier.

* * * * *